United States Patent
Irle et al.

(10) Patent No.: US 7,702,609 B2
(45) Date of Patent: Apr. 20, 2010

(54) ADAPTING TO INEXACT USER INPUT

(75) Inventors: Klaus Irle, Walldorf (DE); Alexander Matz, Schwetzingen (DE)

(73) Assignee: SAP AG, Walldorf (DE)

( * ) Notice: Subject to any disclaimer, the term of this patent is extended or adjusted under 35 U.S.C. 154(b) by 356 days.

(21) Appl. No.: 11/489,917

(22) Filed: Jul. 19, 2006

(65) Prior Publication Data
US 2008/0021850 A1     Jan. 24, 2008

(51) Int. Cl.
*G06F 15/00* (2006.01)
(52) U.S. Cl. .......................................... 706/62
(58) Field of Classification Search ................... 706/62; 707/2, 3, 5
See application file for complete search history.

(56) References Cited

U.S. PATENT DOCUMENTS

2002/0013778 A1 * 1/2002 Neal et al. ...................... 707/3

FOREIGN PATENT DOCUMENTS

WO   WO/2004/072756 A2   8/2004
WO   WO/2004/072757 A2   8/2004

OTHER PUBLICATIONS

Karesten et al ("Enabling Full-Text search for Business Objects in mySAP ERP" Apr. 2006).*

* cited by examiner

*Primary Examiner*—David R Vincent
*Assistant Examiner*—Lut Wong
(74) *Attorney, Agent, or Firm*—Mintz, Levin, Cohn, Ferris, Glovsky and Popeo, P.C.

(57) ABSTRACT

Systems and techniques for adapting to inexact user input. In one aspect, a system includes one or more machine-readable media storing instructions operable to cause one or more machines to perform operations. The operations include receiving input from a user over a data entry field, conducting an attribute-limited search in a transactional data store for a value that matches the user input, the attribute-limited search being limited to one or more, but less than all, attributes in the transactional data store, in response determining that a match between the user input and the value of the one or more searched attributes exists, accessing a transactional data store record having the match, and in response to determining that the match does not exist, automatically identifying a record that includes a match to the user input outside of the one or more searched attributes.

14 Claims, 5 Drawing Sheets

PAST CUSTOMER ORDERS

Customer Name:  Customer Number:
SAP AG         13911-217001

| Order Number | Order Data | Salesperson | Products |
|---|---|---|---|
| 13344 | 6/6/06 | Smith | Widget 1 |
| 3344 | 5/5/05 | Lee | Widget 2 |
| 2222 | 4/4/04 | Smythe | Widget 1 |
| 1124 | 3/3/03 | Jones | Widget 3 |

ADAPTING TO INEXACT USER INPUT

BACKGROUND

This disclosure relates to systems and techniques for adapting to inexact user input.

Humans interact with computers and other data processing devices to input information in a variety of different ways, including inputting text, selecting icons, and generating acoustic inputs. When the input from a user is not exact, i.e., when it does not match the expectations of a data processing device, the data processing device is often unable to adapt to the inexactitude.

SUMMARY

Systems and techniques for adapting to inexact user input are described. In one aspect, a system includes one or more machine-readable media storing instructions operable to cause one or more machines to perform operations. The operations include receiving input from a user over a data entry field, conducting an attribute-limited search in a transactional data store for a value that matches the user input, the attribute-limited search being limited to one or more, but less than all, attributes in the transactional data store, in response determining that a match between the user input and the value of the one or more searched attributes exists, accessing a transactional data store record having the match, and in response to determining that the match does not exist, automatically identifying a record that includes a match to the user input outside of the one or more searched attributes.

This and other aspects can include one or more of the following features. The record can be automatically identified by searching an indexed data store that is mapped to the transactional data store, by full text searching the indexed data store, and/or by text searching a data store that is mapped to the transactional data store. The user input can be text input received over a text box widget. When it is determined that the match does not exist, the operations can include presenting the user with a collection of information drawn from one or more records that include a match to the user input outside of the one or more searched attributes and receiving a user selection of a selected record from the collection of information drawn from the records that include the match.

When it is determined that the match does not exist, the operations can include accessing the record that includes a match to the user input outside of the one or more searched attributes. The record can be accessed by transporting content of the record back to the data entry field. The value that matches the user input can be identical to the user input.

In another aspect, a machine-implemented method can include rendering a data entry field, receiving input from a user over the data entry field, searching values of an attribute in a collection of data objects for a match to the user input, and in response to determining that a match with the user input does not exist in the searched values, automatically text searching content that originated from the collection of data objects for the match with the user input that is outside the searched attribute.

This and other aspects can include one or more of the following features. The data entry field can be rendered along with an identification that input received over the data entry field can be of a single category or unrestricted by category or along with an identification that input received over the data entry field should be restricted to an expected category of input. The searched attribute can be related to the expected category of input. Searching the values of the attribute for the match can include searching for a value that meets a criteria that is based on the user input. The data entry field can include a visual display that includes multiple data entry fields. At least a portion of the content that originated from a data object with the match can be transported back to the data entry fields in the visual display.

In another aspect, a system includes a data input field to receive input from a user, a collection of data objects organized in accordance with a transactional data model, an indexed data store that stored indexed content that is mapped to at least some of the data objects, attribute-limited search logic to search values of an attribute in the collection of data objects for a match to user input received over the data input field, text search logic to search the indexed data store for a record that includes a match to the user input outside of the attribute, and switching logic to automatically switch from an attribute-limited search of the collection of data objects conducted by the attribute-limited search logic to a text search of the indexed data store conducted by the text search logic when the user input received over the data input field does not match any value in the attributes searched during the attribute-limited search. The collection of data objects includes attributes that are not searched.

This and other aspects can include one or more of the following features. The system can also include an identification that input received over the data entry field is to be restricted to an expected category of input. The attribute can be related to the expected category of input.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
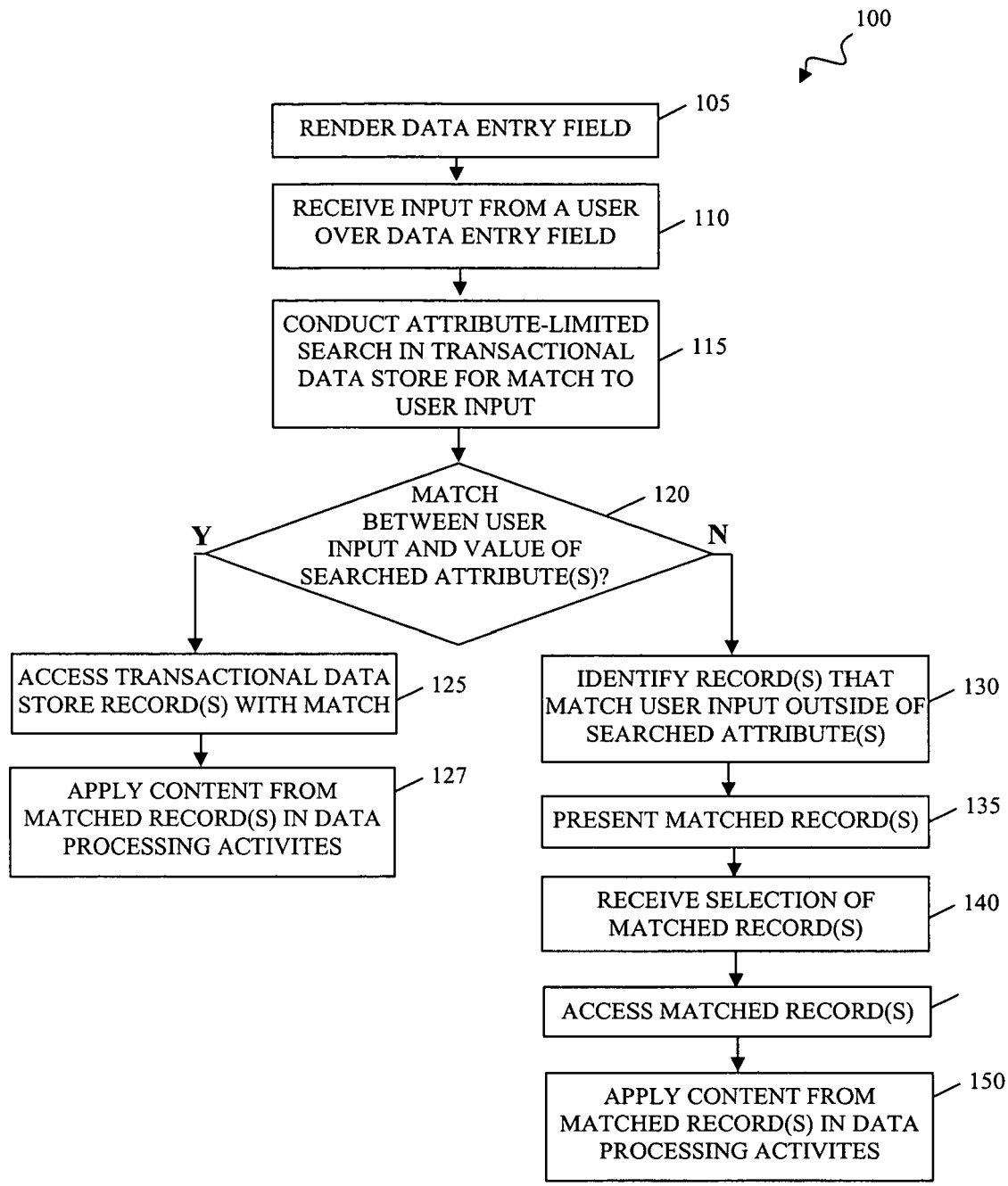
FIG. 1 is a flowchart of a process for adapting to inexact user input.
Figures 8, 9:
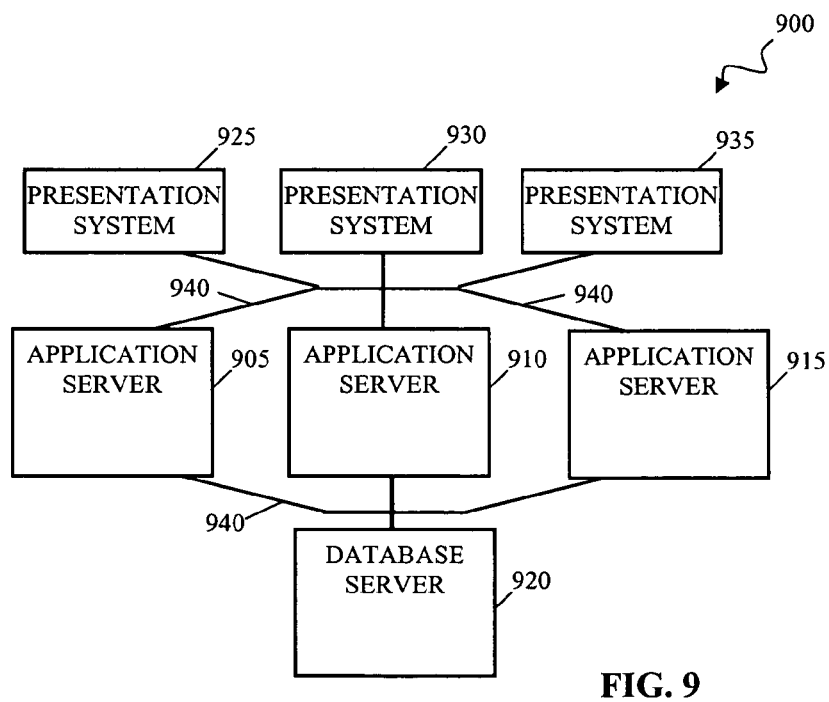
FIG. 9 shows a distributed data processing system landscape that can be used to perform operations such as the process of FIG. 1.

FIG. 1 is a flowchart of a process 100 for adapting to inexact user input. Process 100 can be performed by a system of one or more data processing devices that perform operations in accordance with machine-readable instructions. For example, process 100 can be performed by multiple data processing devices that are organized in a three-tiered hierarchical data processing system landscape, such as shown in FIG. 9 below.

The system performing process 100 can render a data entry field for a user at 105. A data entry field is a portion of an interaction modality with a user that has been allocated to receive user input. For example, the rendered data entry field can be a box or other space on a visual display that presents the user with the opportunity to input information. As another example, the rendered data entry field can be a pause after an auditory prompt that presents the user with the opportunity to input acoustic information.

Figure 2:
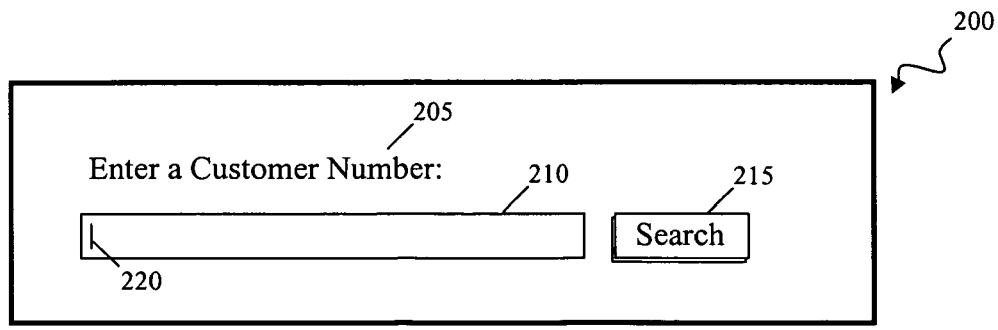
FIGS. 2, 3, and 4 show example data entry fields on visual displays.
Figure 3:
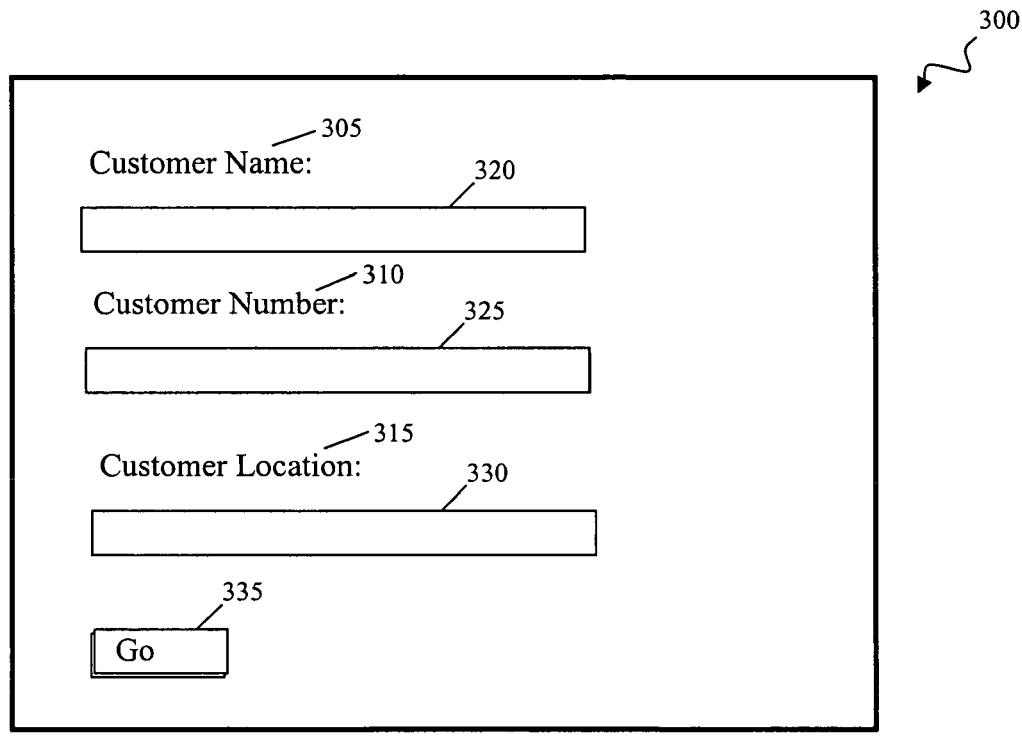
Figure 4:
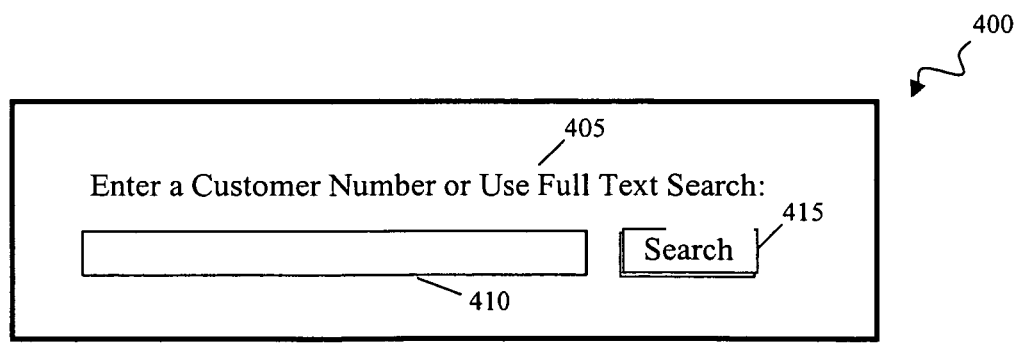

FIGS. 2, 3, and 4 show example data entry fields on visual displays. In particular, FIG. 2 shows a visual display 200 that includes a header 205, a text box widget 210, and an input trigger 215. Header 205 is output from a data processing device and is designed to cue a user to input information over text box widget 210. Header 205 identifies that input over text box widget 210 should, if exact, be restricted to a certain expected category of input, namely, a "Customer Number."

Text box widget 210 is a portion of a graphical user interface (GUI) that presents a user with the opportunity to input text. A text box widget is typically rectangular and generally includes a border to demarcate the text box widget from other portions of the GUI. In some implementations, a text box widget can include a caret 220 to indicate which section of text a user is currently editing.

Input trigger 215 triggers the input the text found in text box widget 210. In triggering input trigger 215, a user is generally indicating that the text in text box widget 210 falls within the category identified by header 205 and can be applied to a specified purpose. The purpose can be specified by the visual display, e.g., in the text found on input trigger 215. For example, a user's interaction with input trigger 215 indicates that the text in text box widget 210 is a customer number, and text in input trigger 215 indicates that the customer number can be applied to conduct a search for records that are associated with that customer number. Other specified purposes include, e.g., going to a interface rendition of a record or other data store and saving a record with the text in text box widget 210 in a particular role.

FIG. 3 shows a visual display 300 that includes a collection of headers 305, 310, 315, a collection of text box widgets 320, 325, 330, and an input trigger 335. Header 305 is designed to cue a user to input text over text box widget 320 that, if exact, should be restricted to a "Customer Name." Header 310 is designed to cue a user to input text over text box widget 325 that, if exact, should be restricted to a "Customer Number." Header 315 is designed to cue a user to input text over text box widget 330 that, if exact, should be restricted to a "Customer Location."

Input trigger 335 triggers the input of information over one or more of text box widgets 320, 325, 330. In triggering input trigger 335, a user is generally indicating that the text entered in one or more of text box widgets 320, 325, 330 falls within the category identified by the relevant of headers 305, 310, 315 and can be used to "go to" a user interface rendition of a record or other data store that with that text in the relevant category.

FIG. 4 shows a visual display 400 that includes a header 405, a text box widget 410, and an input trigger 415. Unlike headers 205, 305, 310, 315, header 405 does not allege to restrict the data input over text box widget 410 to a single category of input. Instead, header 405 cues a user to input data that is either of a single category (i.e., "a customer number") or unrestricted by category (i.e., "or use full text search"). Thus, in triggering input trigger 415, a user is generally indicating that the text entered in text box widget 410 can be used to conduct a search even if the text is not restricted to a "customer number."

Visual displays 200, 300, 400 can be rendered using visual output devices associated with any of a number of different data processing devices. For example, visual displays 200, 300, 400 can be rendered a computer monitor, a touch screen, a liquid crystal display (LCD) screen of a cell phone or a PDA, or the like.

Returning to FIG. 1, the system performing process 100 can receive input from a user over a data entry field at 110. The system can use the received input to conduct an attribute-limited search in a transactional data store for a match to the user input at 115. An attribute-limited search is a search that is limited to a subset of less than all of the attributes in a transactional data store. For example, an attribute-limited search can be limited to a single attribute in a transactional data store.

Figure 5:
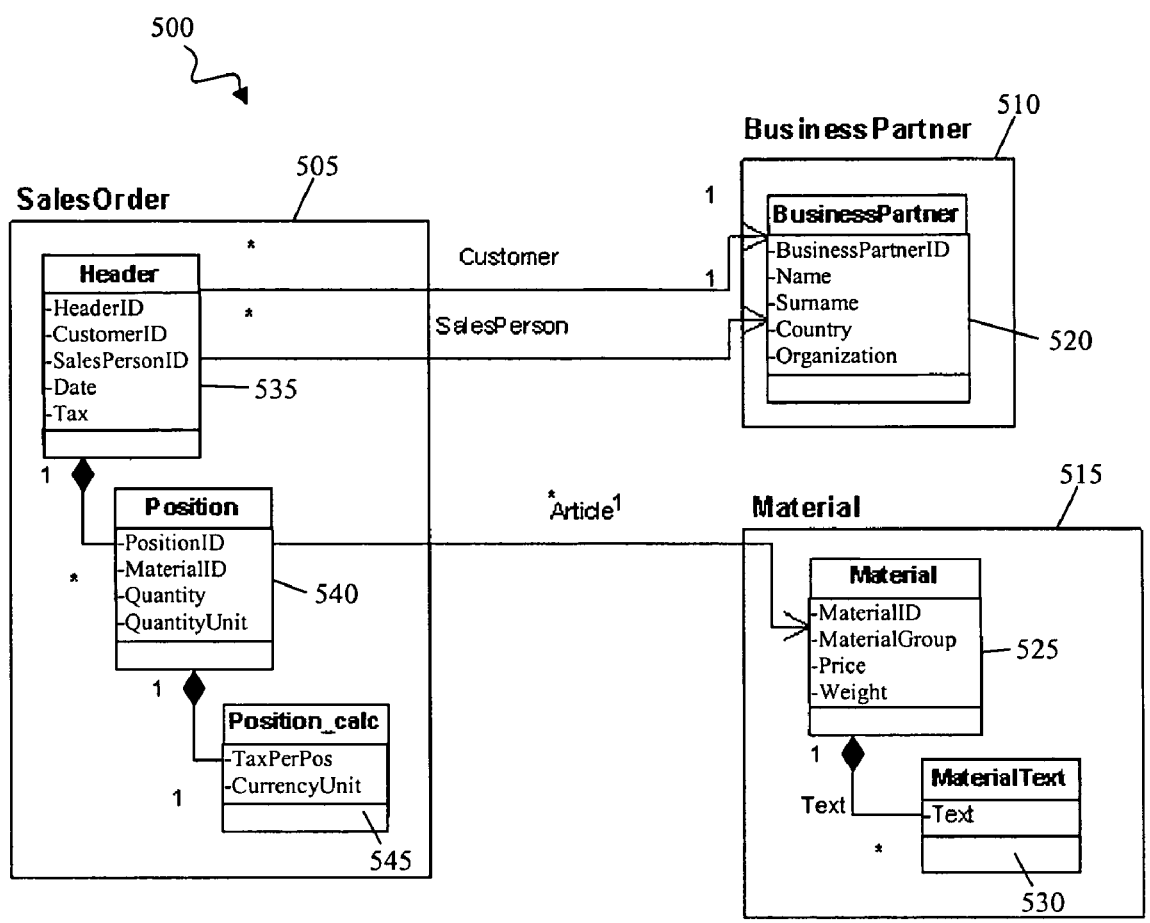
FIG. 5 shows an example transactional data model that can be used to build a transactional data store.

FIG. 5 shows an example transactional data model 500 that can be used to build a transactional data store. A data model is the logical and physical structure of a data store, and can include the physical storage parameters needed to implement a design. Transactional data models are generally tailored to facilitate modification of the stored data. In this regard, transactional data models generally ensure that modifications can be made quickly by using relatively small data storage structures that can be modified independently of other transactional data structures. A relatively small data storage structure is one that is comparable in size to the largest common change transaction. A change transaction is a transaction in which the stored data content is added, deleted, or otherwise changed. A transactional data model can thus include individual data objects that are comparable in size to common changes to content. For example, a transactional data model can include data objects that correspond to individual sales orders in a business, individual customers, and/or individual products.

Transactional data model 500 is a collection of business objects and the relationships between business objects. Transactional data model 500 includes a sales order package 505, a business partner package 510, and a material package 515. Business partner package 510 can include a business partner object class 520. Business partner object class 520 has a business partner identity attribute, a name attribute, a surname attribute, a country attribute, and an organization attribute.

Material package 515 can include a material object class 525 and material text object classes 530. Material object class 525 has a material identity attribute, a material group attribute, a price attribute, and a weight attribute. Material text object class 530 has a text attribute. Each material object class 525 can have a collection of zero or more associated material text object classes 530 in the role of "text."

Sales order package 505 can include a header object class 535, a position object class 540, and a position calculation object class 545. Header object class 535 has a header identity attribute, a customer identity attribute, a salesperson identity attribute, a date attribute, and a tax attribute. Header object class 535 is related to a first associated business partner object class 520 in the role of "customer" and to a second associated business partner object class 520 in the role of "salesperson." Header object class 535 also has a collection of zero or more associated position object classes 540.

Position object class 540 has a position identity attribute, a material identity attribute, a quantity attribute, and a quantity unit. Position object class 540 is related to one or more material object classes 525. Each position object class 540 also has an associated position calculation object class 545. Position calculation object class 545 has a "taxperpos" attribute and a currency unit attribute. Taxperpos attributes deal with the tax rate at a position.

Data stored in instantiated objects within transactional data model 500 can characterize the operations of an enterprise. For example, objects within transactional data model 500 can characterize a collection of sales events. Moreover, such objects can be modified easily as individual sales events are added, modified, or deleted.

Returning to FIG. 1, in searching a transactional data store that is based on transactional data model 500, the scope of an attribute-limited search can be limited to a single attribute in the transactional data store. For example, a search for a match to a customer number can be limited to the customer identity attributes of header objects of header object class 535. As another example, a search for a match to a customer name can be limited to the name attributes of business partner objects of business partner objects class 520 that are related to header objects of header object class 535 in the role "customer."

The system performing process 100 can determine if there is a match between the user input and one or more values of the searched subset of attributes in the transactional data store at 120. A match can exist, e.g., when the user input is identical to the value of an attribute or when the value of an attribute meets a criteria that is based on the user input.

If the system determines that there is a match, the system can access one or more records in the transactional data store that include the match at 125. Content from matched record(s) can then be applied in subsequent data processing activities at 127. For example, data from the matched record(s) can be presented to the user over an output device.

If the system determines that there is no match in the search subset of attributes in the transactional data store, the system can identify record(s) that match the user input outside of the searched attributes at 130. A match is outside the searched attributes when a match is in attributes that are not part of the subset of attributes searched at 115. As before, a match can exist, e.g., when the user input is identical to the value of an attribute or when the value of an attribute meets a criteria that is based on the user input.

The system can identify record(s) that match the user input outside of the searched attributes by performing searches on the same transactional data store or by performing searches on another, second data store. Such a second data store can be mapped to the transactional data store in that, over time, the content of the second data store is populated based on the content of the transactional data store. Such a population can be performed, e.g., by maintaining a list or other record of the changes to the transactional data store and periodically updating the second data store to reflect those changes. Since the changes are only made periodically, it is not necessary that the second data store be a transactional data model. Rather, the second data store can be tailored to facilitate data processing activities other than transactions, such as searching and reporting. Given the ease of searching and reporting with such second data stores, the scope of a search can often redundantly include the attributes already searched in the attribute-limited search without undue costs in time and computational effort.

In one implementation, the second data store can be an indexed data store. An indexed data store is a collection of information that is stored at one or more data storage devices. An indexed data store can store this information in one or more documents, data structures, data models, or other data storage devices (hereinafter "documents") that are indexed to an inverted index and searchable through the index. The index can be an index of one or more attributes of business objects in a transactional model, such as model 500 (FIG. 5). The index can also be an index of the linear text content of the business objects in a transactional model, such as model 500 (FIG. 5). In general, an index for business objects can include an index of any portion of the business objects.

An indexed data store can be searched, e.g., using full text searching, attribute or short text searching, long text searching, fuzzy text searching, linguistic searching, phonetic searching, similarity searching, advanced text mining searches, and the like. A search engine for searching an indexed data store can support wild cards, Boolean operators, and, furthermore, be case sensitive or case insensitive. A full text search searches the entire content of a data object, including attributes and a long text portion of the data object. Attribute searches only search the attributes of the data object. Long text searches only search the long text portion of the data object. Fuzzy text searches return results that do not exactly match the search criteria. For example, a fuzzy text search can find strings that include typographical errors. Linguistic searches use the principal form of a word to search. For example, a linguistic search for "house" returns "houses" and "housing." Phonetic searching returns results that sound like a search word specified in the search criteria. For example, a search for "Smith" returns "Smythe," "Smithe," and "Smyth." Similarity searching finds data records that are similar to the one specified in the search criteria. As noted, the search engine can perform other types of searches.

An indexed data store can be searched using one or more search engines. A search engine can be dedicated to the indexed data store. Alternatively, the search engines can be external to the indexed data store but, nevertheless, work in conjunction with the indexed data store. For example, an indexed data store can be searched using the Text Retrieval and Information Extraction service (TREX) component of SAP Netweaver (SAP AG, Walldorf, Germany).

Returning to FIG. 1, the system performing process 100 can present any matched records to a user at 135 and receive a user's selection of particular matched records at 140. The matched records can be presented in accordance with some sort of ordering, such as a chronological ordering or a relevancy ordering. In presenting a matched record, the system can draw information describing the record from originally-searched transactional data store or from the second data store. The entire content matched records need not be presented. For example, a redaction of the record content that is sufficient for a user to make an informed selection can be presented. In some implementations, if only a single matching record is identified at 130, then the single record need not be presented and a user selection need not be received (i.e., 135, 140 can be skipped). Rather, such the single matching record can be accessed, and content from the single record applied, without intervening interaction with the user.

Since the search at 130 is not attribute-limited, a wide variety of search results can be returned at 130. For example, suppose a customer's name is input at 110. The attribute-limited search conducted at 115 is limited to a customer number attribute and no matched records are found. The subsequent search at 130 may return both customers and salespeople having the input name, along with materials and/or locations in which the name appears (e.g., as a street address or the like). This can be useful in certain enterprise-related applications. For example, the name of a material may be used to identify not only a material record that relates to the name but also business processes that are applicable to the named material.

The system performing process 100 can also access the matched record(s) at 145. Content from matched record(s) can then be applied in subsequent data processing activities at 150. For example, data from the matched record(s) can be presented to the user over an output device.

Figures 6, 7:
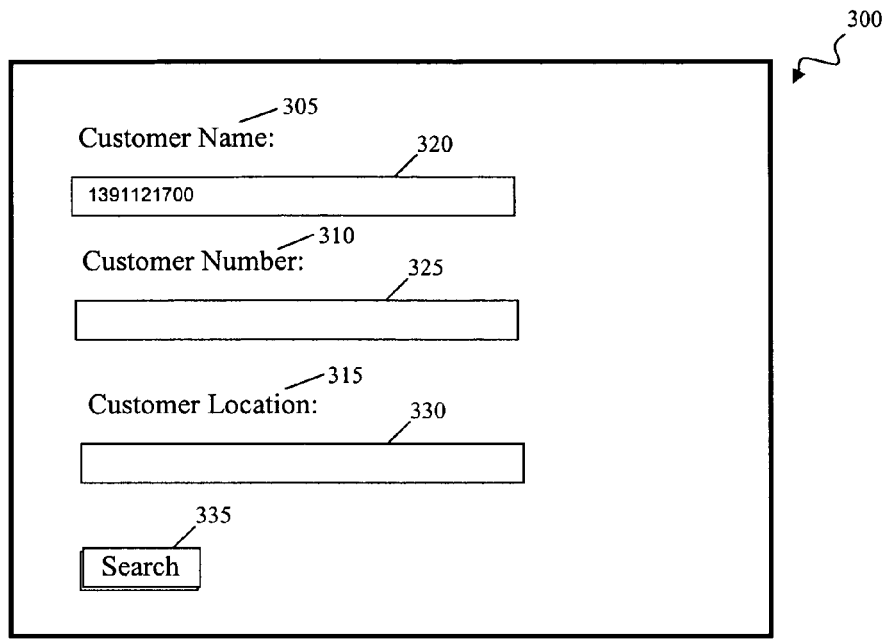
FIGS. 6, 7, and 8 illustrate one example of how the process of FIG. 1 can be used to adapt to inexact user input over a visual display.

FIGS. 6-8 illustrates one example of how process 100 (FIG. 1) can be used to adapt to inexact user input over visual display 300. For example, a user can input "13911-217001" in text box widget 320. As discussed above, header 305 is designed to cue a user to input text over text box widget 320 that, if exact, should be restricted to a "Customer Name." The text "1391121700" is thus inexact. The system performing process 100 can conduct an attribute-limited search for a match to "13911-21700" in the name attributes of business partner objects in the role "customer." When the system determines that no match to "1391121700" is to be found in the name attributes, the system can seek to identify records that match "1391121700" outside of the name attributes of business partner objects in the role "customer." This change in the search can be accomplished automatically, i.e., without input from a human or other user.

If multiple matching records are identified, they can be presented to a user for the user's selection of the proper record. FIG. 7 shows an example display screen 700 in which matched records are presented to a user. Display screen 700 includes a collection 705 of matched records 710, 715 that include text that matches the inexact user input text "1391121700" in text box widget 320 (FIG. 6). Matched record 710 includes the text "1391121700" in a customer number field. Matched record 715 includes the text "1391121700" in a telephone number field.

Once the appropriate of records 710, 715 is selected by a user, the content of the selected record can be applied in data processing activities, for example, for the performance of a business process. FIG. 8 shows an example display screen 800 in which the contents of a selected record are applied to the presentation of past customer orders to a user. Display screen 800 includes a collection 805 of information regarding past customer orders.

If only a single matching record is to be found in the name attributes, the system performing process 100 can immediately access the matched record for subsequent data processing activities at 145. In the illustrated example, the content of the matched record is applied to the creation of display screen 800 (FIG. 8) without the need for a user selection from display screen 700 (FIG. 7).

There are many other scenarios where process 100 (FIG. 1) can be used to adapt to inexact user input. For example, when searching for a product on the website of a retailer, a consumer may enter the name of a book in a data entry field that is identified as expecting an ISBN book number input. As another example, a consumer may enter the name of a part or a product (e.g., "BMW 735") in a data entry field that is identified as expecting a part or product number input. After an initial unsuccessful attribute-limited search, the system performing process 100 can proceed to identify and present records that match the user input outside of the identified attributes.

Comparable adaptations to inexact user input can be performed in business scenarios. For example, personnel at a call center may handle inquiries regarding product returns. A data entry field that is presented to the call center personnel may be identified as expecting an identification number that is associated with a product return authorization. However, certain customers who call the call center may not know this identification number, but may know other information such as the product that was returned or their customer name or number. In this scenario, call center personnel can simply enter the known information into the data entry field that is identified as expecting the unknown identification number but yet have a meaningful search conducted without the delay associated with switching search screens and the like.

FIG. 9 shows a distributed data processing system landscape 900 that can be used to perform operations such as process 100 (FIG. 1). A distributed data processing system landscape can include a collection of data processing devices, software, and/or systems (hereinafter "data processing systems") that operate autonomously yet coordinate their operations across data communication links in a network. By operating autonomously, the data processing systems can operate in parallel, handling local workloads of data processing activities. The data communication links allow information regarding the activities, including the results of performance of the activities, to be exchanged between data processing systems. To these ends, many distributed data processing systems include distributed databases and system-wide rules for the exchange of data.

System landscape 900 thus is a collection of data processing systems that exchange information for the performance of one or more data processing activities in accordance with the logic of a set of machine readable instructions. In particular, system landscape 900 is a three tiered hierarchy of data processing systems and includes application servers 905, 910, 915, one or more database servers 920, and presentation systems 925, 930, 935. Application servers 905, 910, 915 and database server 920 are in data communication with each other and with presentation systems 925, 930, 935 over a collection of data links 940.

Application servers 905, 910, 915 are data processing systems that provide services to presentation systems 925, 930, 935 and/or database server 910. Each application server 905, 910, 915 can provide services in accordance with the logic of one or more applications. An application is a program or group of programs that perform one or more sets of data processing activities. An application can perform data processing activities directly for a user or for another application. Examples of applications include word processors, database programs, Web browsers, development tools, drawing, paint, image editing programs, and communication programs. In the context of enterprise software that is operable to integrate and manage the operations of a company or other enterprise, applications can be allocated to managing product lifecycles, managing customer relationships, managing supply chains, managing master data, managing financial activities, and the like. Applications use the services of the computer's operating system and other supporting applications. Applications can exchange information using predefined protocols. Application servers 905, 910, 915 can each provide services in accordance with the logic of multiple applications, and services in accordance with the logic of a single application can be provided by two or more of application servers 905, 910, 915.

Database server 920 is a data processing system that provides storage, organization, retrieval, and presentation of instructions and data services to application servers 905, 910, 915 and/or presentation systems 925, 930, 935.

Presentation systems 925, 930, 935 are data processing systems that receive services from application servers 905, 910, 915 and database server 920. Presentation systems 925, 930, 935 can also manage interaction with human users at their respective locations, such as the display of information on a graphical user interface. Presentation systems 925, 930, 935 can generate requests for services and convey the requests to application servers 905, 910, 915 and database server 920 over one or more of data links 940.

Data links 940 can form a data communication network such as a LAN, a WAN, or the Internet. System landscape 900 can also include additional data links, including direct links between presentation systems 925, 930, 935 and data links to systems and devices outside landscape 900, such as a communications gateway (not shown).

The roles of "server" and "client" can be played by the same individual data processing system in system landscape 900. For example, the data processing system denoted as server 905 may receive certain services from presentation system 925. Thus, a data processing system may be a "server" in the context of a first set of services but a "client" in the context of a second set of services.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. As used herein, the term "machine-readable storage medium" refers to any computer program product, apparatus and/or device (e.g., magnetic discs, optical disks, memory, Programmable Logic Devices (PLDs)) used to tangibly store machine instructions and/or data. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing environment that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the environment can be interconnected by any form or medium of digital data communication (e.g., a communication network). Examples of communication networks include a local area network ("LAN"), a wide area network ("WAN"), and the Internet.

A number of implementations have been described. Nevertheless, it will be understood that various modifications may be made. For example, user input can be pre-screened to determine if it meets certain formatting requirements before it is used to search a transactional or other data store. As another example, process steps can be performed in different order, and steps can be omitted, and meaningful results nevertheless achieved. As another example, system elements can be rearranged or omitted and meaningful results nevertheless achieved.

Accordingly, other implementations are within the scope of the following claims.

What is claimed is:

1. An article comprising a tangible machine-readable storage medium embodying instructions that when performed by one or more machines result in operations comprising:
   receiving input from a user over a data entry field;
   conducting an attribute-limited search in a transactional data store storing transactional data for a value that matches the user input, the attribute-limited search being limited to one or more, but less than all, attributes in the transactional data store;
   in response determining that a match between the user input and the value of the one or more searched attributes exists, accessing a transactional data store record having the match; and
   in response to determining that the match does not exist, conducting a second search in a second data store for a value that matches the user input, the second search being directed to the attributes of the attribute-limited search and at least one additional attribute, the second search identifying a matching second data store record;
   the second data store being mapped to the transactional data such that content of the second data store is populated based on content of the transactional data store, searching and reporting of the second data store being quicker than searching and reporting of the transactional data store.

2. The article of claim 1, wherein automatically identifying the record comprises full text searching the second data store.

3. The article of claim 1, wherein receiving the user input comprises receiving text input over a text box widget.

4. The article of claim 1, wherein the operations further comprise, in further response to determining that the match does not exist:
   presenting the user with a collection of information drawn from one or more records that include a match to the user input outside of the one or more searched attributes; and
   receiving a user selection of a selected record from the collection of information drawn from the records that include the match.

5. The article of claim 1, wherein the operations further comprise, in further response to determining that the match does not exist, accessing the record that includes a match to the user input outside of the one or more searched attributes.

6. The article of claim 5, wherein accessing the record comprises transporting content of the record back to the data entry field.

7. The article of claim 1, wherein the value that matches the user input is identical to the user input.

8. A machine-implemented method comprising:
   rendering a data entry field;
   receiving input from a user over the data entry field;
   searching, in a first search, values of an attribute in a collection of data objects in a transactional data store storing transactional data for a match to the user input;
   in response to determining that a match with the user input does not exist in the searched values in the first search, automatically text searching, in a second search of the transactional data store, content that originated from the collection of data objects for the match with the user input that is outside the searched attribute in the first search; and in response to determining that the match does not exist in the second search, conducting a third search in a second data store for a value that matches the user input, the second search being directed to the attributes of the first and second searches, the third search identifying a matching second data store record, the second data store being mapped to the transactional data such that content of the second data store is populated based on content of the transactional data store, searching and reporting of the second data store being quicker than searching and reporting of the transactional data store.

9. The method of claim 8, wherein rendering the data entry field comprises rendering the data entry field along with an identification that input received over the data entry field can be of a single category or unrestricted by category.

10. The method of claim 8, wherein rendering the data entry field comprises rendering the data entry field along with an identification that input received over the data entry field should be restricted to an expected category of input.

11. The method of claim 10, wherein the searched attribute is related to the expected category of input.

12. The method of claim 8, wherein searching the values of the attribute for the match comprises searching for a value that meets a criteria that is based on the user input.

13. The method of claim 8, wherein rendering the data entry field comprises rendering a visual display that includes multiple data entry fields.

14. The method of claim 13, further comprising transporting at least a portion of the content that originated from a data object with the match back to the data entry fields in the visual display.

* * * * *